Figure 1:
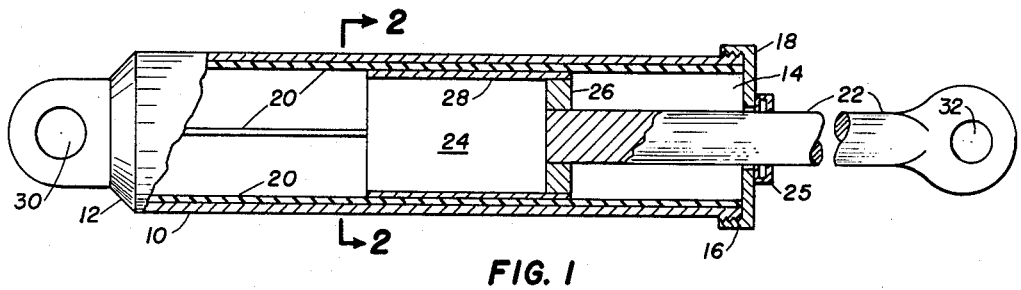

Sept. 21, 1965  D. L. KLASS  3,207,269

ELECTRIC VISCOUS FIELD RESPONSIVE SHOCK ABSORBER

Filed Dec. 12, 1963

INVENTOR.
DONALD L. KLASS
BY Edward H. Lang
ATTORNEY.

3,207,269
ELECTRIC VISCOUS FIELD RESPONSIVE SHOCK ABSORBER

Donald L. Klass, Barrington, Ill., assignor to The Pure Oil Company, Palatine, Ill., a corporation of Ohio
Filed Dec. 12, 1963, Ser. No. 330,084
12 Claims. (Cl. 188—87)

This invention relates to a shock damping device and, more particularly, to a shock damping device employing at least two shock absorbers containing a field-responsive fluid and novel means for increasing the bulk viscosity of the field-responsive fluid.

Certain fluids, which are herein designated "field-responsive liquids," respond to the application of the appropriate field by instantaneously, but reversibly, changing in apparent bulk viscosity. More specifically, the term "field-responsive fluid" denotes both electro-viscous fluids which display a dramatic change in apparent bulk modulus in response to the presence of an electric field and magnetic fluids which display a similar change in apparent bulk modulus in response to the presence of magnetic fields. The field-responsive fluids increase in bulk viscosity in proportion to the strength of the applied field. In the presence of strong fields, the fluids thicken into a semi-solid or solid condition. Electro-viscous fluids and magnetic fluids are described in U.S. Patents 2,661,596 and 2,886,151 and electro-viscous fluids are also described in U.S. Patent 3,047,507.

The electro-viscous fluids of the prior art respond to both alternating and direct electric potentials when the potentials are applied to electrodes disposed in contact with the electro-viscous fluid. In addition, transient-electric-potential-responsive electro-viscous fluids contained in receptacles fabricated of materials of high resistivity exhibit a change in bulk modulus when exposed to a transient electric potential applied by means of electrodes disposed externally with respect to the receptacle. As the term is used in this specification, transient electric potentials include potentials of varying positive voltage, as well as alternating potentials.

Devices which are sensitive to shock or vibration, such as delicate electric instruments, are often mounted on shock absorbers when used in environments where they are subject to shock or vibration. Such devices are frequently mounted on two or more shock absorbers which are positioned around the device to be protected, which shock absorbers act in unison to afford better protection of the device than if only one shock absorber were used. Shock absorbers using field-responsive fluids are known in the art, as exemplified by U.S. Patent 2,661,596. The shock damping device of this invention includes at least two shock absorbers employing a field-responsive fluid positioned on different sides of the mass to be protected and means for subjecting the field-responsive fluid to the appropriate field.

Briefly, the shock damping device of this invention comprises a mass to be protected from shock or vibration supported on opposite sides thereof by supporting links which are mechanically connected to supporting structures between which the mass is located. The supporting links include shock absorbers containing a field-responsive fluid (e.g., an electro-viscous fluid). The appropriate field (e.g., electric field in the case of an electro-viscous fluid) is applied to the fluid in each shock absorber by separate electric circuits, each of which includes a potential source. The electric circuits are closed to subject the field-responsive fluid to the appropriate field by shock-sensitive switches located on the side of the mass opposite that where the respective shock absorbers are located.

It is, therefore, an object of this invention to provide a device and method for damping shock.

Another object of this invention is to provide a shock damping device which utilizes at least two shock absorbers containing a field-responsive fluid.

Still another object of this invention is to provide a shock damping device which includes shock absorbers containing a field-responsive fluid positioned on different sides of the mass to be protected and means for energizing the field-responsive fluids.

Figure 2:
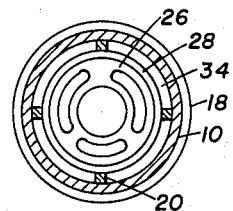
Figure 4:
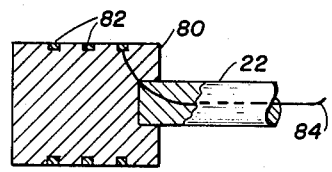
Figure 3:
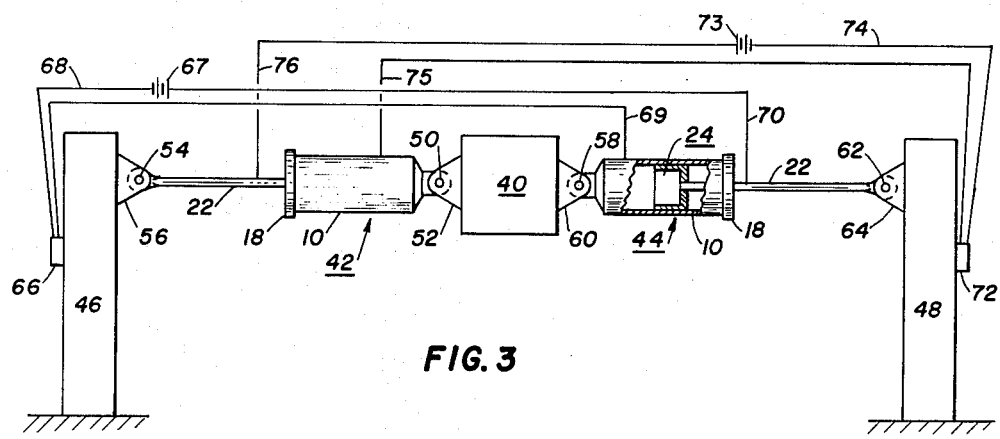

These and further objects of this invention will be described or become apparent as the description thereof herein proceeds and reference is made to the accompanying drawings in which:

FIGURE 1 is a frontal view, partly in section, of a shock absorber which may be used in the device of this invention, FIGURE 2 is a sectional view in the direction 2—2 of FIGURE 1, FIGURE 3 is a diagrammatic view of the apparatus of this invention, and FIGURE 4 is a sectional view of a plunger and rod assembly which may be used in conjunction with the device of FIGURE 1 when magnetic fluids are employed.

Referring to FIGURE 1, which is a frontal view, partly in section, of an example of a shock absorber which may be used in the apparatus of this invention, tube 10 comprises the body of the shock absorber having closed end 12 and open end 14. Secured to open end 14, as by threads 16, is cover plate 18. Within tube 10 are disposed longitudinal stringer-like guides 20 which are small in radial thickness, preferably being more than about 0.01 inch in radial thickness. Lying axially in tube 10 is rod 22, which is connected to plunger 24 and extends through seal 25 in cover plate 18 in fluid-tight relationship therewith. Plunger 24 consists of a support portion 26 and tube portion 28. Tube portion 28 fits closely within guides 20 and is thereby guided and supported for axial movement of rod 22 and plunger 24 with respect to tube 10. The shock absorber is mechanically connected between a supporting structure and the device to be protected by pins or bolts extending through apertures 30 and 32.

Tube 10 is preferably made of steel, but it may be fabricated of other electrically conductive materials. If desired, tube 10 may be fabricated of an electrically non-conductive material so long as it is provided with an electrically conductive interior surface. At least tubular portion 28 of plunger 24 is made of an electrically conductive material, but the entire plunger assembly, including rod 22, can be fabricated of steel. Stringer-like guides 20 are made of an electrically insulating material, which is preferably resistant to wear. Hard plastic materials, such as Bakelite, may be used.

A thin fluid film of an electro-viscous fluid is maintained in the space between plunger 24 and tube 10, and also within and on each side of plunger 24. Ordinarily, the entire interior of tube 10 should be completely filled with the fluid. The electro-viscous fluid has a low viscosity when not under the influence of an applied electric field, the residual viscosity being adjusted to provide a suitable damping action when no electric field is applied. Seal 25 is made of an electrically insulating material, such as a synthetic elastomer, and serves to maintain the fluid within tube 10 and permit free movement of rod 22. It is evident that when an electric field is applied transversely to the electro-viscous fluid film occupying the space between tube 10 and plunger 24, the shear resistance of the fluid film increases dramatically and the movement of plunger 24 with respect to tube 10 can be accomplished only with the application of great force.

The magnitude of force required to cause compression or expansion of the shock absorber depends on the properties of the electro-viscous fluid used, the magnitude of the applied electric field, and the distance between the interior of tube 10 and plunger 24. The electric field is most conveniently applied by connecting one terminal of the potential source to be hereinafter described to tube 10 and the other terminal of the potential source to rod 22 when rod 22, support portion 26 and tube 28 are fabricated of an electrically conductive material. Suitable electrical insulation must be provided to prevent the shock absorber from being shorted-out by the remainder of the shock damping device in which the shock absorber is utilized and by rod 22 passing through cover portion 18 and seal 25. It will be understood that alternate structures may be used to provide more convenient electrical insulation. For example, support portion 26 may be fabricated of an electrically insulating material and an electrical conductor connected to tube portion 28 of plunger 24 may pass through rod 22 in electrically insulated relationship therewith.

FIGURE 2 shows an alternative embodiment of the shock absorber in which supporting portion 26 of plunger 24 is web-like to provide flow of fluid through supporting portion 26. This construction greatly reduces the damping effect of the shock absorber and it is especially appropriate where the residual viscosity of the electro-viscous fluid would of itself provide an undesirably great damping when it is not energized. This construction also permits the radial thickness of annular space 34 between tube 28 of plunger 24 and tube 10 to be reduced to an absolute minimum, as for example, as little as 0.003 inch. By using such small spacing, the device can still achieve considerable damping under the influence of a relatively small electric potential. The support portion 26 of plunger 24 can be made solid, in which case the distance between tube 10 and plunger 24 should be increased to permit minimum damping in the absence of an applied electric potential. When an electric potential is applied, very great damping is nevertheless obtained, because plunger 24 acts as a piston trapping the incompressible electro-viscous fluid and relative movement of plunger 24 and tube 10 is prevented not only by the bonding achieved between tube 10 and plunger 24, but also because the fluid is rendered semi-solid in the space between tube 10 and plunger 24, and must of course be displaced through this space in order to permit the flow fluid essential to movement of plunger 24.

As the description herein proceeds, it will be obvious that the shock damping device is not limited to the utilization of the shock absorbers depicted in FIGURES 1 and 2. As for example, while tube 10 and plunger 24 are illustrated as being cylindrical, it will be obvious that components of other shapes may be used. Broadly, the shock-dampening device uses any shock absorber containing a field-responsive fluid for controlling relative motion between two members in a direction extending between the mass and the supporting structure.

Referring to FIGURE 3, the reference numeral 40 designates the mass which is to be protected from shock in an environment subject to shock. Mass 40 is supported on opposite sides thereof by supporting links, which include shock absorbers 42 and 44, mechanically connecting mass 40 to supporting structures 46 and 48, respectively. Supporting structures 46 and 48 are subject to the same shock to which mass 40 is subject. On one side of mass 40, tube 10 of shock absorber 42 is connected by pin 50 through bracket 52 on mass 40. The connection between mass 40 and supporting structure 46 is completed by pin 54 extending through bracket 56 on supporting structure 46 to connect rod 22 of shock absorber 42 to structure 46. Similarly, on the side of mass 40 opposite shock absorber 42, tube 10 of shock absorber 44 is connected by pin 58 to bracket 60 on mass 40, while rod 22 of shock absorber 44 is connected by pin 62 to bracket 64 on supporting structure 48.

Located in shock-susceptive relationship with supporting structure 46 (located so that it is susceptible to substantially the same degree of shock as supporting structure 46) is switch 66, which is adapted to close the circuit containing potential source 67 upon being subjected to mechanical shock. When switch 66 is closed, potential source 67 is connected by lead wire 68, switch 66 and lead wire 69 to tube 10 of shock absorber 44 and by lead wire 70 to rod 22 of shock absorber 44 to energize the electro-viscous fluid in shock absorber 44. Switch 72, which is adapted to complete the circuit containing potential source 73 upon being subjected to mechanical shock, is located in shock-susceptive relationship with supporting structure 48. The closing of switch 72 results in the energization of the electro-viscous fluid in shock absorber 42 by applying potential thereto from potential source 73 through lead wire 74, switch 72 and lead wire 75 to tube 10 of shock absorber 42. This circuit is completed by lead wire 76 connecting the second output terminal of potential source 73 to rod 22 of shock absorber 42. Switches 66 and 72 may be switches of any suitable design which are actuated upon being subjected to mechanical shock or vibration, as for example, Model 66 Vibraswitch which is described in Technical Bulletin 5915 of the Aeronautical and Instrument Division of the Robertshaw-Fulton Controls Co.

It will be evident that other shock-sensitive means may be employed to energize shock absorbers 42 and 44. For example, nonmechanical means, such as transducers located in shock-susceptive relationship with the appropriate supporting structures, may be used in place of the switches and associated power sources to energize shock absorbers 42 and 44 when subjected to shock. Suitable transducers are those comprising piezoelectric elements, including polycrystalline piezoelectric elements, such as metallic titanates derived from metals such as barium, strontium, magnesium, manganese, lead, and zirconium. Other piezoelectric elements include monocrystalline piezoelectric crystals, such as Rochelle salt, quartz, etc.

It will be evident that in some instances, as for example, when mass 40 is also subject to the force of gravity or the residual viscosity of the electro-viscous fluid is not sufficient to provide a suitable damping action in the absence of the shock-induced electric field, it may be desirable to maintain the electro-viscous fluid in at least one of the shock absorbers under the influence of a small potential when shock-sensitive switches 66 and 72 are not closing the circuits (or the transducers do not have an electrical output), rather than to reduce the electrical potential to zero. In such instances, it is possible to apply a sufficient field to maintain the plunger 24 in at least one of the shock absorbers in place as against the force of gravity, and thereby prevent movement of mass 40 under the influence of gravity. This can be readily accomplished by directly connecting a source of relatively small potential between tube 10 and rod 22 of at least one of the shock absorbers. By suitable adjustment of the supplementary potential source, a desired damping action of the shock absorber can be obtained when the respective shock-sensitive means (i.e., switches or transducers) are not activated.

Although shock absorbers employing electro-viscous fluids are preferably used in the apparatus of this invention, shock absorbers employing magnetic fluids may also be used, as hereinbefore disclosed. However, inasmuch as the output of a piezoelectric crystal is alternating and the electromagnet used with magnetic fluid devices are portative, it will be evident that changes must be made in the energizing circuits hereinbefore described when transducers are used as the energizing means. For example, the electrical outputs of transducers 66 and 72 can be used to close an electrical circuit between a D.C. potential source and coils around tube 40 or in plunger 24. An example of a plunger which may be used with magnetic fluids is shown in FIGURE 4. Plunger body 80, which is connected to rod 22, is made of magnetic iron. A plurality of coils 82 are placed around the periphery of plunger 80 in slots provided therefor. Electrical connection is made to coils 82 by conductor 84, which passes through plunger 80 and rod 22 in electrically insulated relationship therewith, and by rod 22 which is electrically connected to the other terminal ends of coils 82. Coils 82 produce a magnetic flux when energized and thus increase the shear resistance of the magnetic fluid-film disposed between plunger 80 and tube 10. Alternatively, the coil may be placed around tube 10, which coil may be directly connected to the transducers by using a shading coil.

Supporting structures 46 and 48 may be individual structures or different walls of the same structure, i.e., a building. When the supporting structures are subjected to mechanical shock, the shock-sensitive energizing means in shock-susceptive relationship therewith will produce an electric current so that each of the shock-sensitive means will cause the field-responsive fluid in the more remote shock absorber to be subjected to the appropriate field. It can, therefore, be seen that the shock absorbers will then act in unison to protect the mass from shock in opposite directions.

Although this invention has been described in relation to specific embodiments, it will be apparent that obvious modifications may be made by one skilled in the art without departing from the intended scope of this invention. The lead wires connecting the shock-sensitive energizing means (i.e., switches or transducers) to the electro-viscous fluid-containing shock absorbers may contain means for varying the potentials applied to the electro-viscous fluid in the shock absorbers to obtain the desired damping effect. Inasmuch as certain electro-viscous fluids exhibit a change in bulk viscosity when exposed to an alternating electric field, even though the fluid is not in contact with the potential-carrying electrodes, such electro-viscous fluid may be energized by electrodes disposed externally of a shock absorber fabricated of an electrically insulating material. The mass to be protected may be mounted between two or more pairs of shock absorbers, which shock absorbers may be positioned on two or more sides of the mass. While the shock-sensitive energizing means are shown in FIGURE 3 as being mounted on the supporting structures, it will be obvious that each of the shock-sensitive means need only be in shock-susceptive relationship (i.e. subject to substantially the same degree of shock) with the supporting structure opposite the shock absorber to which it is electrically connected.

The embodiments of the invention in which an exclusive property or privilege is claimed are defined as follows:

1. A shock-damping device consisting essentially of
   (a) first and second supporting structures,
   (b) a mass supported on opposite sides thereof by first and second supports, each of said supports mechanically connecting a side of said mass to one of said supporting structures,
   (c) each of said supports including first and second members having spaced opposing surfaces, one of said members being mechanically connected to a supporting structure and the other member being mechanically connected to a side of said mass, said members being movable with respect to each other in a direction extending between said mass and supporting structure connected thereby, and a field-responsive fluid disposed in the space between said members,
   (d) first circuit means adapted to apply a field transversely of the space between said members of said first support, said first circuit means being actuated by first piezoelectric shock-responsive means adapted to supply an electric potential to said first circuit means upon being subjected to mechanical shock, said first shock-responsive means being in shock-susceptive relationship with the supporting structure on the side of said mass opposite said first support, and
   (e) second circuit means adapted to apply a field transversely of the space between said members of said second support, said second circuit means being actuated by second piezoelectric shock-responsive means adapted to supply an electric potential to said second circuit means upon being subjected to mechanical shock, said second shock-responsive means being in shock-susceptive relationship with the supporting structure on the side of said mass opposite said second support.

2. A shock-damping device in accordance with claim 1 in which each of said circuit means includes a potential source and said shock-responsive means are switches adapted to close said piezoelectric circuit means upon being subjected to mechanical shock.

3. A shock-damping device in accordance with claim 2 in which said switches are supported on said structures.

4. A shock-damping device in accordance with claim 1 in which said first members are tubular members and said second members are plunger members disposed in said tubular members, said tubular and plunger members being axially movable with respect to each other.

5. A shock-damping device in accordance with claim 4 in which the opposite ends of the tubular and plunger members of each of said supporting links are mechanically connected to said mass and one of said supporting structures.

6. A shock-damping device in accordance with claim 1 in which said field-responsive fluid in each of said supports is an electric field-responsive fluid and said circuit means are adapted to subject said fluid to an electric field.

7. A shock-damping device in accordance with claim 1 in which said field-responsive fluid in each of said supports is a magnetic field-responsive fluid and said circuit means are adapted to subject said fluid to a magnetic field.

8. The method of protecting a mass located in an environment subject to mechanical shock from mechanical shock consisting essentially of supporting said mass in said environment between two supporting structures on opposite sides thereof by field-responsive-fluid-containing shock absorbers, each of said structures having a piezoelectric element secured thereto and upon one of said supporting structures being subjected to mechanical shock, automatically supplying a piezoelectric field, generated by said piezoelectric element to the field-responsive fluid in the shock absorber on the side of said mass opposite the supporting structure subjected to the mechanical shock.

9. The method in accordance with claim 8, in which said field-responsive fluid is an electro-viscous fluid.

10. The method in accordance with claim 8 in which said field-responsive fluid is a magnetic fluid and including means to convert the piezoelectric field to a magnetic field.

11. A shock-damping device in accordance with claim 1 in which said shock-responsive means are piezoelectric crystals.

12. The method in accordance with claim 8 wherein said piezoelectric elements are selected from the group consisting of barium titanate, strontium titanate, magnesium titanate, manganese titanate, lead titanate, zirconium, Rochelle salt and quartz.

References Cited by the Examiner
UNITED STATES PATENTS

| | | | |
|---|---|---|---|
| 2,661,596 | 12/53 | Winslow | 188—88 |
| 2,973,969 | 3/61 | Thall | 188—88 X |
| 3,006,656 | 10/61 | Schaub | 188—88 |
| 3,139,760 | 7/64 | Pfeifer | 188—88 |

OTHER REFERENCES

"Meter for Shock-Velocity Measurements," National Bureau of Standards, Technical News Bulletin, April 1956, pages 60–61.

ARTHUR L. LA POINT, *Primary Examiner.*

EUGENE G. BOTZ, *Examiner.*